United States Patent [19]

Browne et al.

[11] 4,147,930
[45] Apr. 3, 1979

[54] OBJECT LOCATION DETECTOR

[75] Inventors: Arthur Browne, Horley; Waheed G. Baig, Ewell, both of England

[73] Assignee: U.S. Philips Corporation, New York, N.Y.

[21] Appl. No.: 837,406

[22] Filed: Sep. 28, 1977

Related U.S. Application Data

[63] Continuation of Ser. No. 667,580, Mar. 17, 1976, abandoned.

[30] Foreign Application Priority Data

Mar. 20, 1975 [GB] United Kingdom ............... 11659/75

[51] Int. Cl.² ...................... G01D 21/04; H01J 39/12
[52] U.S. Cl. .................................. 250/223 R; 250/202
[58] Field of Search ........................... 250/202, 223 R; 356/157, 158; 209/82 R; 198/394; 250/560, 561, 557

[56] References Cited

U.S. PATENT DOCUMENTS 3,670,153 6/1972 Rempert et al. ..................... 250/202
3,780,298 12/1973 Agadzhanian et al. .............. 250/202

Primary Examiner—Alfred E. Smith
Assistant Examiner—David K. Moore
Attorney, Agent, or Firm—David R. Treacy

[57] ABSTRACT

An apparatus for determining the relative position and orientation of an object by automatic equipment. The objects are transported in a first movement direction on a translucent conveyor belt. A line array of photodiodes is arranged transversely to the belt. The electrical condition of these diodes is scanned in synchronism with the movement of the belt. The extreme signals in the longitudinal and the transverse direction of the belt indicate the tangent points of two sets of mutually parallel, but transverse relative to each other, tangent to the objects. The relative positions of the points are compared with a stored system of coordinates for regularly spaced orientation directions of the objects. The closest correspondence matches the orientation and position of the object. Thus, it is not necessary to memorize each position of objects in an object handling or similar apparatus, so that control processing is simplified.

5 Claims, 13 Drawing Figures

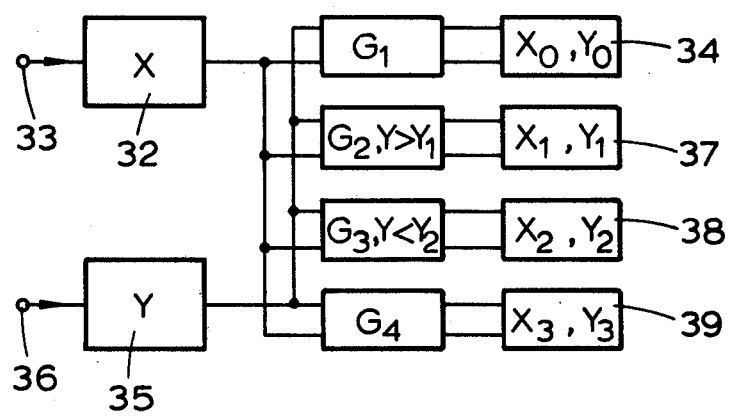
Fig. 3
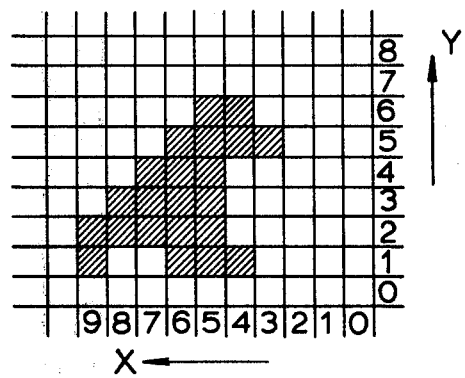
Fig. 4
|  | $X_0$ | $Y_0$ | $X_1$ | $Y_1$ | $X_2$ | $Y_2$ | $X_3$ | $Y_3$ |
|---|---|---|---|---|---|---|---|---|
| 3 | 3 | 5 | 3 | 5 | 3 | 5 | 3 | 5 |
| 4 | 3 | 5 | 4 | 6 | 4 | 1 | 4 | 6 |
| 5 | 3 | 5 | 4 | 6 | 4 | 1 | 5 | 6 |
| 6 | 3 | 5 | 4 | 6 | 4 | 1 | 6 | 5 |
| 7 | 3 | 5 | 4 | 6 | 4 | 1 | 7 | 4 |
| 8 | 3 | 5 | 4 | 6 | 4 | 1 | 8 | 3 |
| 9 | 3 | 5 | 4 | 6 | 4 | 1 | 9 | 2 |
Fig. 5

| | $X_1$ | $Y_1$ | $X_2$ | $Y_2$ | $X_3$ | $Y_3$ | $X_r$ | $Y_r$ | $\sigma$ |
|---|---|---|---|---|---|---|---|---|---|
| 4 | 35 | −10 | 17 | 12 | 44 | − 6 | 1 | 9 | 200.5 |
| 9 | 38 | −19 | 20 | 7 | 41 | −16 | 10 | 16 | 210.5 |
| 14 | 32 | −27 | 1 | 2 | 3 | −14 | 9 | 22 | 220.5 |
| 19 | 27 | −35 | 2 | 2 | 34 | −23 | 8 | 28 | 230.5 |
| 24 | 18 | −34 | 3 | 8 | 28 | −24 | 6 | 31 | 240.5 |
| 29 | 9 | −37 | 5 | 7 | 22 | −16 | 5 | 33 | 250.5 |
| 30 | 8 | −38 | 5 | 6 | 21 | −17 | 5 | 34 | 252.5 |
| 31 | 6 | −38 | 5 | 6 | 20 | −18 | 5 | 34 | 254.5 |
| 32 | 6 | −38 | 6 | 6 | 19 | −19 | 5 | 34 | 0.5 |
| 33 | 5 | − 8 | 7 | 36 | 20 | 11 | 6 | 34 | 2.5 |
| 34 | 5 | − 8 | 9 | 36 | 20 | 10 | 7 | 34 | 4.5 |
| 35 | 4 | − 9 | 8 | 35 | 20 | 9 | 8 | 33 | 6.5 |
| 36 | 4 | − 9 | 10 | 35 | 21 | 17 | 9 | 33 | 8.5 |
| 37 | 3 | − 9 | 11 | 34 | 22 | 16 | 10 | 33 | 10.5 |
| 38 | 3 | − 3 | 13 | 40 | 23 | 21 | 12 | 32 | 12.5 |
| 39 | 3 | − 3 | 15 | 39 | 24 | 20 | 13 | 32 | 14.5 |
| 40 | 3 | − 3 | 17 | 38 | 25 | 19 | 15 | 31 | 16.5 |
| 41 | 3 | − 4 | 19 | 37 | 26 | 18 | 16 | 31 | 18.5 |
| 42 | 14 | − 4 | 21 | 36 | 27 | 16 | 17 | 31 | 20.5 |
| 47 | 13 | − 8 | 29 | 30 | 31 | 29 | 23 | 29 | 30.5 |
| 52 | 11 | − 8 | 36 | 25 | 38 | 23 | 28 | 26 | 40.5 |
| 57 | 9 | −10 | 35 | 16 | 42 | 13 | 32 | 21 | 50.5 |
| 62 | 21 | −14 | 38 | 7 | 44 | 2 | 34 | 16 | 60.5 |
| 67 | 17 | −16 | 9 | 4 | 44 | − 4 | 33 | 12 | 70.5 |
| 72 | 22 | −22 | 3 | 3 | 42 | −14 | 31 | 10 | 80.5 |
| 77 | 18 | −15 | 6 | 14 | 39 | −12 | 30 | 8 | 90.5 |
| 82 | 33 | −24 | 7 | 12 | 35 | −22 | 27 | 9 | 100.5 |
| 87 | 26 | −31 | 10 | 10 | 29 | −23 | 23 | 10 | 110.5 |
| 92 | 18 | −36 | 12 | 8 | 23 | −30 | 17 | 11 | 120.5 |
| 97 | 12 | −26 | 15 | 19 | 20 | 10 | 14 | 11 | 130.5 |
| 102 | 10 | −19 | 20 | 24 | 23 | 21 | 11 | 10 | 140.5 |
| 107 | 5 | −20 | 14 | 20 | 28 | 15 | 9 | 10 | 150.5 |
| 112 | 2 | − 2 | 20 | 35 | 33 | 30 | 8 | 8 | 160.5 |
| 117 | 2 | − 2 | 28 | 29 | 39 | 21 | 10 | 7 | 170.5 |
| 122 | 7 | − 4 | 34 | 22 | 43 | 11 | 11 | 6 | 180.5 |
| 127 | 6 | − 5 | 24 | 15 | 44 | − 0 | 11 | 5 | 190.5 |

Fig.10

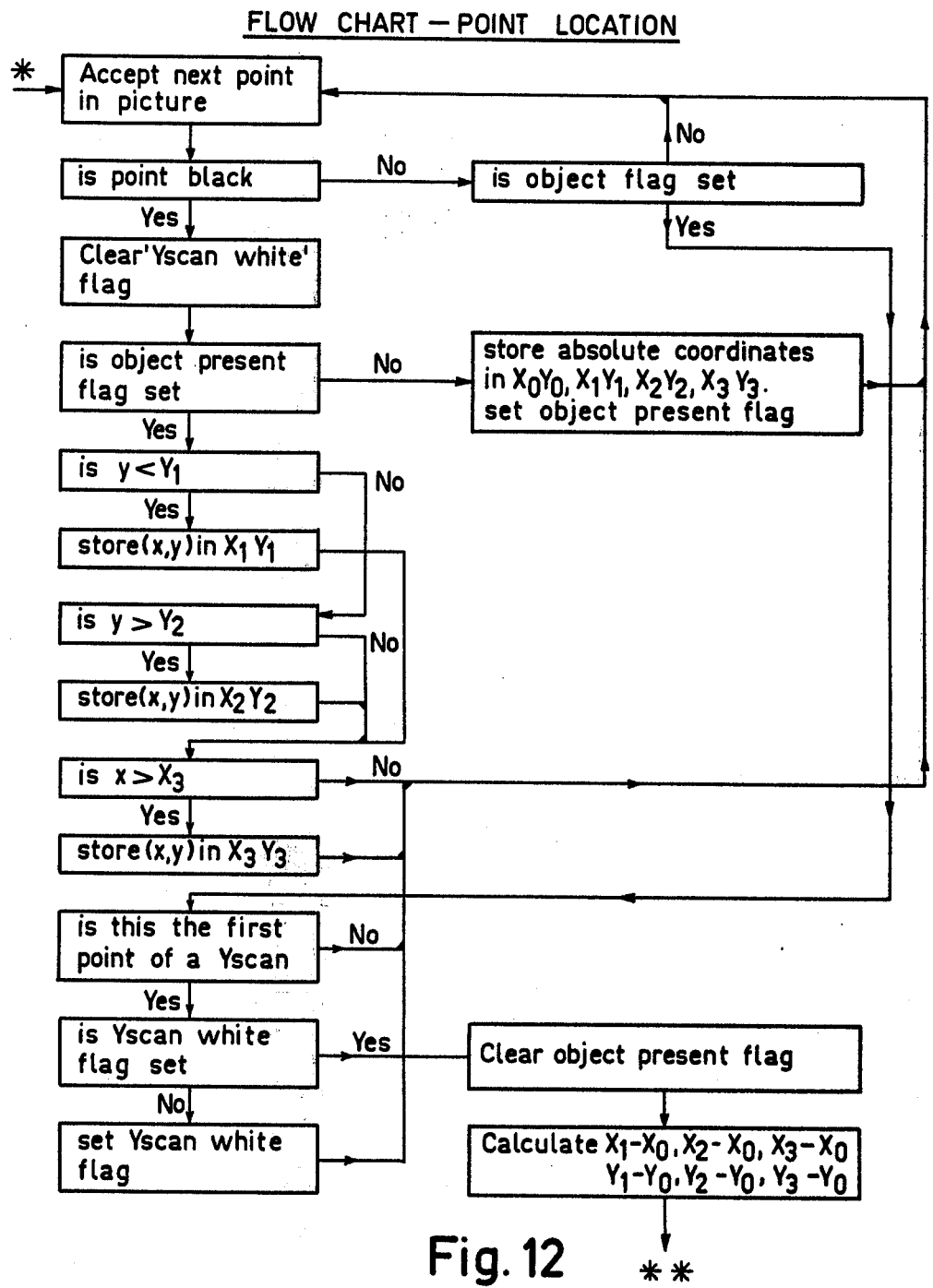

OBJECT LOCATION DETECTOR

This is a continuation of application Ser. No. 667,580, filed Mar. 17, 1976 now abandoned.

BACKGROUND OF THE INVENTION

The invention relates to an apparatus for locating an object, having a predetermined projection figure on a projection surface, when an object is present. The invention can be utilized for determining the position and orientation of objects having a predetermined projection figure (for example, the outline of a flat object but the central plane of the longitudinal section, for example, through an ellipsoidal object may also be concerned), the location of the said objects being subject to uncontrollable factors.

SUMMARY OF THE INVENTION

The object of the invention is to establish this location, so that the objects can be treated or placed in a properly controlled position with respect to an object handling apparatus. According to the invention an apparatus includes means for determining a first pair of tangents in a first direction along said projection, one tangent to each side of the object; means for determining a second pair of tangents in a second direction transverse to the said first direction and along said projection, again one tangent to each side of the object, the first and the second directions being substantially parallel to the projection surface; means for determining a tangent point and the coordinates thereof on each of the said four tangents; and means for determining on the basis of the relative positions of the four tangents points: (a) the orientation of the object with respect to the said first and secnd direction, (b) the position of a reference point on the object relative to the tangents.

The use of the term "tangent" in describing this invention is broader than the true geometric definitions of a tangent, which is a line which touches and is locally parallel to an outline. Herein the tangents have directions which are predetermined and aligned in a linear coordinate system — that is, one in which locations are measured in distances parallel to two principal straight line axes which intersect each other. Where the object has a curved outline the two definitions will coincide. But when the object has a corner, the tangent as herein defined will be in a predetermined direction passing through the corner point. (Geometrically, such a corner would have an infinite number of tangent directions).

In a preferred embodiment of the apparatus in accordance with the invention, the means for determining the parallel tangents employ a sequential linear scanning raster, the two raster scanning directions being parallel to the two tangent directions, the line scan having the first intercept with the object and the line scan having the last intercept with the object defining the first pair of parallel tangents, and the interception point of the line scan which intercepts the object earliest of all line scans from the start of its scan and the interception point of the line scan which emerges from the object latest of all line scans from the start of its scan defining the tangent points of the second pair of tangents. A repetitive pattern of a sufficient number of line scans to determine the most widely separated line scans in which interception will occur for any location and orientation of the object is then defined as a full field linear pattern. This results in a systematic set-up.

In a further preferred embodiment of the apparatus in accordance with the invention, the means for determining the parallel tangents employ linear relative motion between the object and a transverse repetitive single line scan, the first and last line scans to intercept the object defining the first pair of tangents and the interception points of those line scans which intercept and emerge from the object earliest and latest respectively from the start of any line scan defining the tangent points of the second pair of tangents. Use can thus be made, for example, of a conveyor belt mechanism already present for transporting the objects.

In another preferred embodiment of the apparatus in accordance with the invention, the single line scan is provided by a line array of radiation detectors across which an image of the object passes transversely during the linear relative motion. This results in a simple detector structure.

In a further, preferred embodiment yet of the apparatus in accordance with the invention, the single line scan is substantially at right angles to the direction of the linear relative motion. This results in a better geometrical definition.

In still another preferred embodiment of the apparatus in accordance with the invention, the means for determining the orientation and position of the object comprise means for referring to a table of sets of values of relative tangent point positions, precalculated from the predetermined outline of the projection figure, each such set of values being associated with an orientation angle and the reference points position which occurs with that set of values, and means for selecting that orientation angle and reference point position associated with the precalculated set of relative tangent point positions most closely fitting the determined set of relative tangent point positions. Use can thus be advantageously made of known microprocessors.

In a final preferred embodiment of the apparatus in accordance with the invention, the object is arranged on a support which is transparent to radiation emitted by a source arranged underneath the support, the radiation transmitted and not blocked by the object being detectable by the aforementioned means for determining tangents.

BRIEF DESCRIPTION OF THE DRAWING

An embodiment of an apparatus according to the invention will now be described, by way of example, with reference to the accompanying drawings in which:

FIG. 3 is a black diagram of a system for deriving the tangent point coordinates.

FIG. 4 is a graphical representation of a binarised object.

FIG. 5 is a table of the contents of the tangent point stores of FIG. 3 at the end of each Y scan of the object of FIG. 4.

FIG. 10 is a table of the relevant stored reference information for the object of FIG. 9.

FIG. 12 is a flow chart of the logical process for determining tangent point locations.

Referring to FIG. 1, identical objects 1, shown for example in this embodiment as T-shaped piece-parts, are disposed in single file on an endless belt 2, having been deposited there at the conveyor end 3 by means not shown. The pieces 1 are separated along the belt at irregular intervals and are found at different distances from the belt edge. In addition each piece, which in this example is a generally flat or two-dimensional object having at least one side which may be used as a reference edge for the object, is disposed at a random orientation with respect to the belt edge. The purpose of the apparatus of FIG. 1 is to determine the position and orientation of each object on the belt so that a mechanical pick-up device 4 may be moved to the correct position across the belt, have its gripping hand 5 rotated to the correct orientation, and be made to descend and pick-up the object 1 when the belt motion has brought the object 1 vertically under the gripping hand 5. The pick-up device 4 is then moved off the side of the belt and the object 1 deposited onto a work-station 10 in a known position and orientation. For example, the object 1 may be lowered into an assembly jig, not shown, at the work-station 10 which receives other piece-parts at other times which are subsequently fixed together before being removed from the jig.

Figure 1:
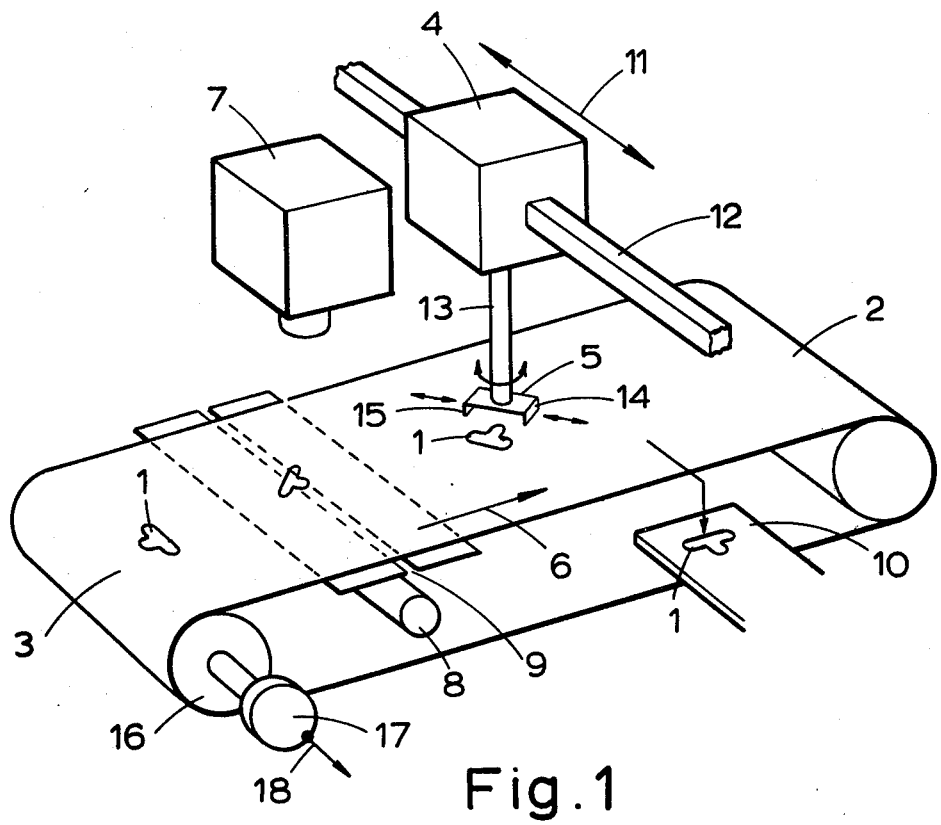
FIG. 1 is a schematic layout of an object handling apparatus incorporating the object location detector.

The upper surface of the belt 2 moves longitudinally in the direction of the arrow 6, driven by means not shown, carrying the objects 1 under a camera 7 to provide a frame scanning motion for camera 7. The belt 2 is made of a translucent material. A light source 8 and a slit 9 extend transversely under the belt, rendering the object 1 visible as a dark outline on a bright background. The camera 7 has a lens, not shown, which images the slit 9 on a line array of photodiodes 20 parallel to the slit. This camera array will be described later with reference to FIG. 2. The information obtained in the camera 7 is processed by means not shown, but to be described later, to provide positioning information for the pick-up device 4. The pick-up device 4 is mounted for motion in the directions of the arrows 11 along the slide-ways 12 to take up the correct position for object pick-up. The shaft 13 carrying the gripping hand 5 is mounted for rotation about its own axis in the vertical direction to take up the correct orientation for object pick-up. The jaws 14 and 15 are adapted to move inwardly on the object to register with reference surfaces on the object and to apply a gripping force thereto.

The belt pulley 16 drives an incremental shaft position encoder 17 which emits a pulse from terminal 18 for a predetermined increment of motion of the belt 2. Each pulse initiative a scan of the object by the line array of photodiodes in the camera 7. The increment of motion is chosen to be small enough in relation to the size of the object 1 to provide a sufficient number of pulses, and hence scans, during the motion of the object 1 past the camera to resolve the details of the object to the degree required.

Figure 2:
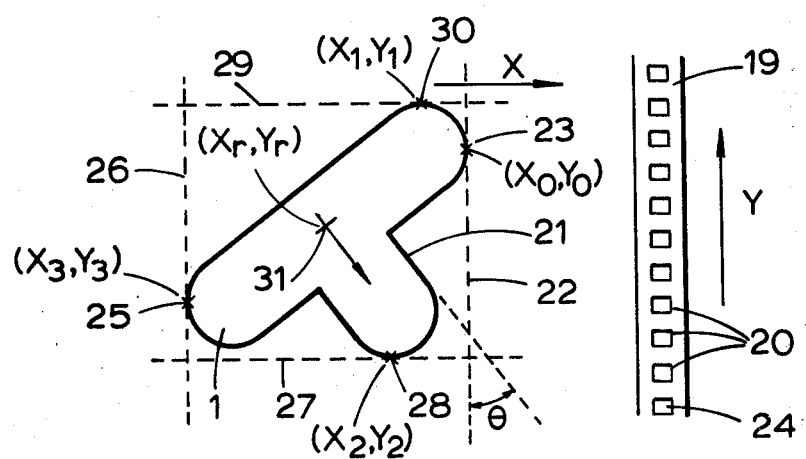
FIG. 2 shows a typical object, with pairs of tangents applied, in relation to a line array of photodiodes.

Referring to FIG. 2, the T-shaped piece part 1 is shown in relation to the projected image of the line array 19 of equally spaced photodiodes 20 previously referred to as being within the camera 7. The direction of the line of the photodiodes 20, being fixed in relation to the edge of the belt, forms a reference direction with respect to which the orientation of a reference surface on the object 1 can be measured. In FIG. 2 is a reference surface 21 on the object is shown inclined at an angle $\theta$ with respect to the direction of the line of photodiodes 20, otherwise defined herein as the reference direction. The dashed line 22 is drawn parallel to the reference direction and is drawn as a tangent to the object at the point 23. Thus, as the object 1 passes under the array 19, in the direction of the arrow X, point 23 is the first point in the object to be scanned and is referred to herein as the first point and is given the coordinates $(X_o, Y_o)$. The X coordinate is referred to an origin which is a point arbitrarily chosen in relation to the belt surface and is measured in the direction of belt motion X. As will be described in more detail later the incremental encoder 17 feeds pulses to a counter, not shown in FIG. 1. The running total of pulses found in this counter at the time of occurrence of a given photodiode signal provides the value of the X ordinate of the part of the object 1 giving rise to that photodiode signal. The Y coordinate is referred to an origin at one end of the array 19, in this case the end 24, and is measured as the number of photodiodes along the array 19 from the end 24 up to the photodiode which registers the presence of the part of the object 1 concerned.

The dashed line 26 is drawn as a tangent to the object at the point 25 and is drawn parallel to the reference direction and hence also parallel to dashed line 22. Thus point 25 is the last point in the object to be scanned and is referred to herein as the last point and is given the coordinates $(X_3, Y_3)$. Thus lines 22 and 26, defined by electrical signals from the array 19, are a pair of parallel tangents applied to the object 1 considered only in a two-dimensional aspect and points 23 and 25 are the respective tangent points whose relative positions will be used as part of the information needed to determine the orientation and position of the object 1.

It is thus also clear that in this sequential scanning raster, more generally defined, the first point and last point identify the most widely separated line scans of the repetitive pattern.

The dashed line 27 is drawn as a tangent to the object 1 at the point 28 and is drawn parallel to the direction of motion of the object 1. The line 27 is determined from the path taken during object motion which intercepts the field of view of that photodiode in the array 19, nearest to the end 24 of the array, which succeeds in detecting the object 1 on any Y scan. Point 28 is referred to herein as the near point and is given the coordinates $(X_2, Y_2)$. The dashed line 29 is drawn as a tangent to the object 1 at the point 30 and is also drawn parallel to the direction of motion of the object 1. The line 29 is also determined from the path taken during object motion which intercepts the field of view of that photodiode in the array 19, furthest from the end 24 of the array, which succeeds in detecting the object 1 on any Y scan. Point 30 is referred to herein as the distant point and is given the coordinates $(X_1, Y_1)$.

In this sequential scanning raster, the points 28 and 30 are therefore the most widely separated line scan coordinates in the pattern. Thus the lines 27 and 29, defined as a result of the motion of the belt, are a pair of parallel tangents applied to the object 1 transversely to the pair of tangents 22 and 26. Points 28 and 30 are the respective tangent points whose relative positions, taken with those of points 23 and 25, which will be used to determine the orientation and position of the object 1. The orientation of the object 1 is given by the angle $\theta$ as described before. The position of the object as a whole is given by the coordinates (Xr, Yr) of a reference point 31 chosen in the object 1 so that when this point is positioned vertically under the axis of rotation of shaft 13 of the pick-up device 4 only rotation of the jaws 14 and 15 about this axis is then necessary to position the jaws correctly with respect to the surfaces in the object 1 with which the jaws are designed to engage.

The line array of photodiodes 19 has been mentioned previously as carrying out scans in the reference or Y direction. Each scan is carried out by sampling the output of each photodiode in sequence starting at the end 24. Between scans the current flowing in each photodiode is very nearly proportional to the intensity of light falling on the photodiode. The total charge built up on a storage capacitor associated one each with each photodiode is thus proportional to the product of the light intensity and the time of exposure to the light. Each scan consists of discharging the contents of each condenser in turn through a common terminal. The effect is to obtain a sequence of current or voltage amplitudes related to the light intensity observed by each photodiode, since the time between scans is arranged to be the same for all photodiodes in the array 19. Since the illumination conditions at the camera station are arranged to provide a high contrast between the bright background and the dark object, the output from the array common terminal is thresholded and inverted to produce a binary signal having the value 0 when a background signal is present and the value 1 when an object signal is present. During a scan these binary signals are thus generated at this rate at which a sampling control circuit, not shown, samples the photodiode outputs.

It will be clear from FIG. 2 that, since the outline of the object 1 is predetermined, the relative positions of the four tangent points are determined almost entirely by the orientation of the object 1 and that the absolute values of the positions of the four tangent points are determined almost entirely by the position of the object 1 on the belt 2. Some exceptions that may occur will be due to the small number of different object orientations which give rise to the same set of four tangent point coordinates. In some practical situations the object outline can be deliberately chosen to make it suitable not only for its final use but also to ensure that no ambiguous set of tangent point coordinates can arise. Other exceptions may occur because a tangent may touch the object at more than one point. In the description that follows it will be seen that all but one tangent point on each tangent are rejected.

The operation of the electronic part of the embodiment may be summarized as follows. Once the four tangents points have been determined, reference is made to a pre-calculated table of sets of values of tangent point coordinates, each set being associated with the relevant value of $\theta$ and (Xr, Yr). The set of values of coordinates most closely fitting the measured values is selected and the values of $\theta$ and (Xr, Yr) supplied to the pick-up device to enable the jaw angle and position to be set for a successful pick-up when the object reaches the pick-up area later.

FIGS. 3, 4 and 5 show schematically how the tangent point coordinates are obtained. The object in FIG. 4 is deliberately scaled down to simplify the description, and shows object 1 in its binarised form. Referring to FIG. 3, the X counter 32 receives belt pulses on terminal 33 from the incremental encoder 17 of FIG. 1. The content of X counter 32 which represents, instantaneously, the position of the belt 2 is applied to each of the four gates G1, G2, G3 and G4. Gate 1 is controlled by means not shown to be open only on the first Y scan which intersects the object. On the occurrence of each '1' or 'black' signal obtained during this first scan, the contents of the X counter are written into the Xo store 34. If there are further '1' signals during the first Y scan, the Xo value will remain unchanged despite repeated writing into store 34. When the first scan is complete, gate G1 is closed by means not shown for the remainder of the object, thus preserving the X values of the first point in the store 34. The Y counter 35 is set to zero at the start of each Y scan and receives Y scan clock pulses on terminal 36 during the scan. The content of counter 35 represents the position of the photodiode being sampled at that moment. On the occurrence of the first '1' signal obtained during the first Y scan, the counter 35 content is written into the appropriate part of store 34 also under the control of gate G1. Thus, at the end of the first Y scan, store 34 contains the lowest Y value occurring during the scan. If there are two or more black points having the same X value but different Y values, this arrangement ensures that only the point having the lowest Y value is recorded. Thus only one tangent point, the first point, is obtained. In the example of a binarised object shown in FIG. 4 only one black point is found on scan X×3 having a Y value of 5. This is shown in FIG. 5 on line 3 of the (Xo,Yo) column as the point (3, 5) and since the gate G1 remains closed for all subsequent scans, all subsequent entries in this column are unchanged.

The gates G2, G3 and G4 are connected to write the contents of the X and Y counters into stores 37, 38 and 39 respectively. These three gates are also opened by the control means not shown at the time when the value (Xo, Yo) is being written into store 34. Thus at the end of the first Y scan to encounter the object 1, each of the four stores contains the value of (Xo, Yo) which in the example of FIG. 5 is shown as (3,5) at the head ot all four columns.

On all subsequent Y scans gate G2 is only opened when a '1' signal is obtained provided that at that time the instantaneous value of Y in the Y counter 35 exceeds the value of Y already found in store 37. The X value written into store 37 will be the simultaneously occurring value found in the X counter 32. Therefore at the conclusion of object scanning, store 37 will contain the XY coordinates of a point having the lowest X consistent with the highest value of Y found on any Y scan. Thus in FIG. 4, two points on the object, points (4,6) and (5,6), have the highest Y ordinate found. The logic of gate G2 ensures that only the first point, (4,6) is taken into the store 37 as being the distant point. In FIG. 5, the (X1, Y1) column shows only one change when, at the end of the second scan (line 4), the point (4, 6) occurs.

In like manner, on all subsequent scans after the first, gate G3 is only opened when a '1' signal is obtained provided that at that time the instantaneous value of Y in the Y counter 35 falls short of the value of Y already found in store 38. The X value written into store 38 will be the simultaneously occurring value found in the X counter 32. At the conclusion of object scanning, store 38 will contain the XY coordinates of a point having the lowest X value consistent with the lowest value of Y found on any Y scan. Thus in FIG. 4, four points on the object, points (4,1), (5,1), (6,1) and (9,1) have the lowest Y ordinate found. The logic of gate G2 ensures that only the first point, (4,1) is taken into the store as being the near point. In FIG. 5, the (X2, Y2) column shows only one change when, at the beginning of the second scan, the point (4, 1) occurs.

The gate G4 has control means not shown that keep it open for all scans until object scanning is complete. Thus, at the end of each Y scan, the store 39 contains the (X, Y) coordinates of the last black point seen in that scan. Thus, the contents of store 39 change, in general, until the last black point on the last scan is encountered and the XY values then found are left in store 39. The last column in FIG. 5 shows the values found in store 39 at the end of each Y scan. The value (9,2) remains as the coordinates of the last point in the object.

The operation of the electronic part of the apparatus will now be described in more detail with reference to FIGS. 6, 7 and 8.

Figure 6:
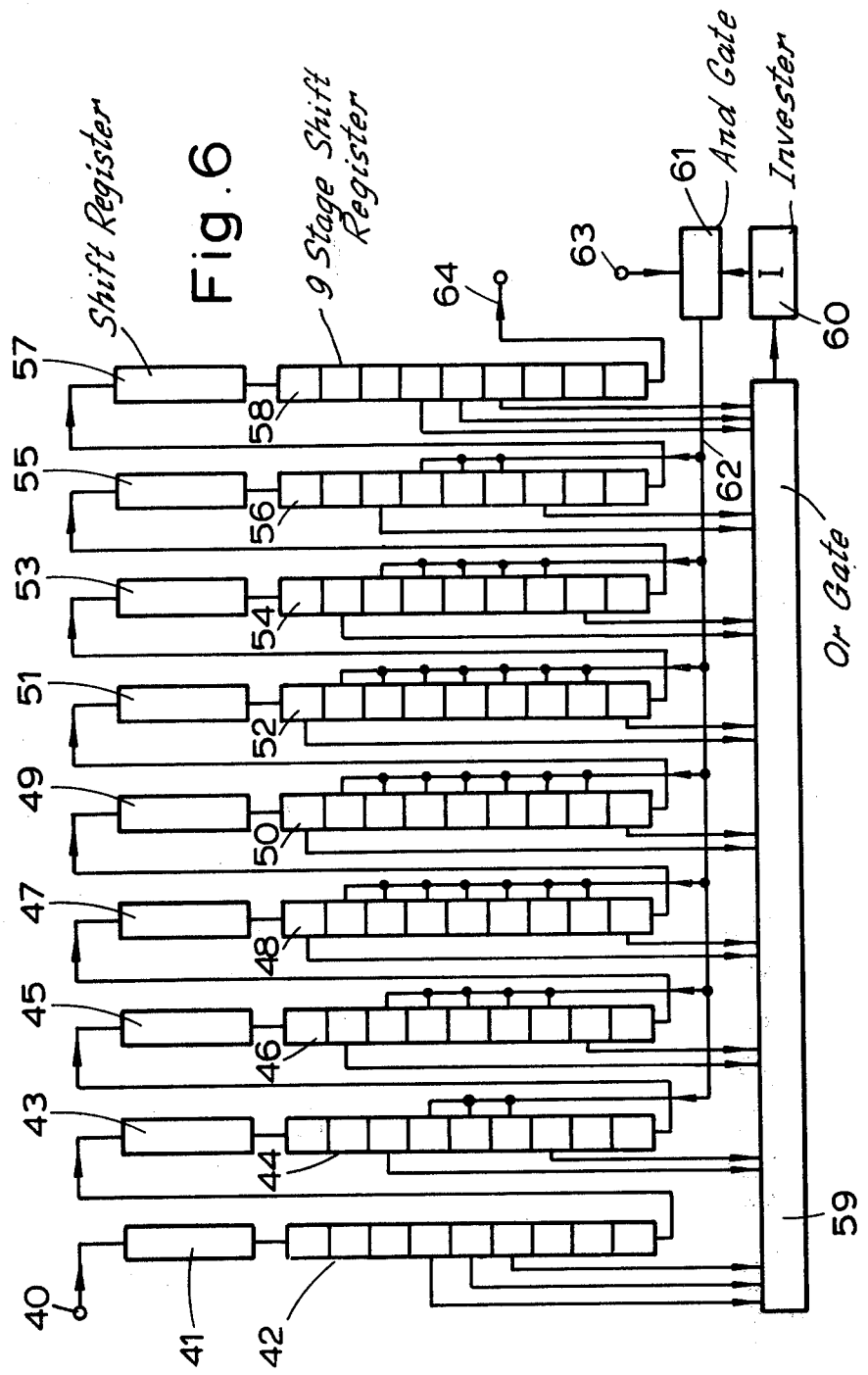
FIG. 6 is a signal flow diagram of an apparatus used to remove unwanted signals from the camera output.

Referring to FIG. 6, apparatus is shown for applying a processing operator to the thresholded output obtained from the line array camera described with reference to FIGS. 1 and 2. In a practical environment the belt 2 will not be uniformly translucent. Marks of various kinds will inevitably accumulate on such a recirculating belt over an extended period of time. In addition, occassional foreign bodies will be deposited onto the belt 2 along with the objects to be handled. The apparatus of FIG. 6 provides means for identifying and removing the signals due to these marks from the camera output before it is used to determine the position of the tangent points.

In FIG. 6 a set of nine columns of shift registers 41 to 58 inclusive are connected head-to-tail in series. Each pair of registers 41, 42; 43, 44; ---- 57, 58 has the same total number of stages as the camera has photodiodes and is thus able to store one complete Y scan of thresholded camera output exactly. Thus, after nine complete Y scans the nine, nine-stage shift registers 42, 44, --- 58 contain a 9×9 ordered array of binary picture element values representing a portion of the scene. The OR gate 59 has twenty inputs, each one connected to a stage in one of the nine stage registers 42, 44, --- 58. The connection points in these registers are chosen to form a ring of adjacent picture elements having a diameter of nine picture elements. Any output of OR gate 59 is inverted in inverter stage 60 before being applied to one input of a two-way AND gate 61. The other input 63 of AND gate 61 is fed with clock pulses from a source not shown which are interleaved with the shift register clock pulses. The output 62 of AND gate 61 is fed to those stages of the shift registers 42, 44 --- 58 which lie within the aforementioned ring of adjacent picture elements.

In operation, the thresholded camera output is applied via terminal 40 to the top end of shift register 41. All the shift registers 41, 42, --- 58 are fed with the same clock pulses as the camera. After one complete Y scan the registers 41 and 42 are therefore loaded with the binary output of the camera obtained during that scan. On a further Y scan, the contents of registers 41 and 42 are transferred to registers 43 and 44 and the new scan output is stored in registers 41 and 42. Thus laterally adjacent picture elements in the object, viewed by the same photodiode, always give rise to laterally adjacent '1' signals in the registers 42, 44, --- 58 at all times during a Y scan. Thus all parts of the field of view scanned by the camera during object motion pass through the aforementioned ring of picture elements. The output of OR gate 59 can only be a '0' if all twenty stages forming the ring contain '0's. When the interleaved clock pulse is applied as a '1' to AND gate 61, the output 62 of the gate can only be a '1' of the inverter 60 is receiving a '0' input. The output 62, when a '1', is connected to set al shift register stages to '0' to which it is connected. Thus the occurrence of a white ring of picture element provides a signal to clear all stages within the ring. Any collection of '1' or black points small enough to fit within the ring at any time during the Y scan will be thus removed from the final output 64 of the operator. Thus any object small enought to fit inside the ring is removed, however close it may be to any part of a true object, provided a single ring of white points can be found which surround the small object.

Figure 7:
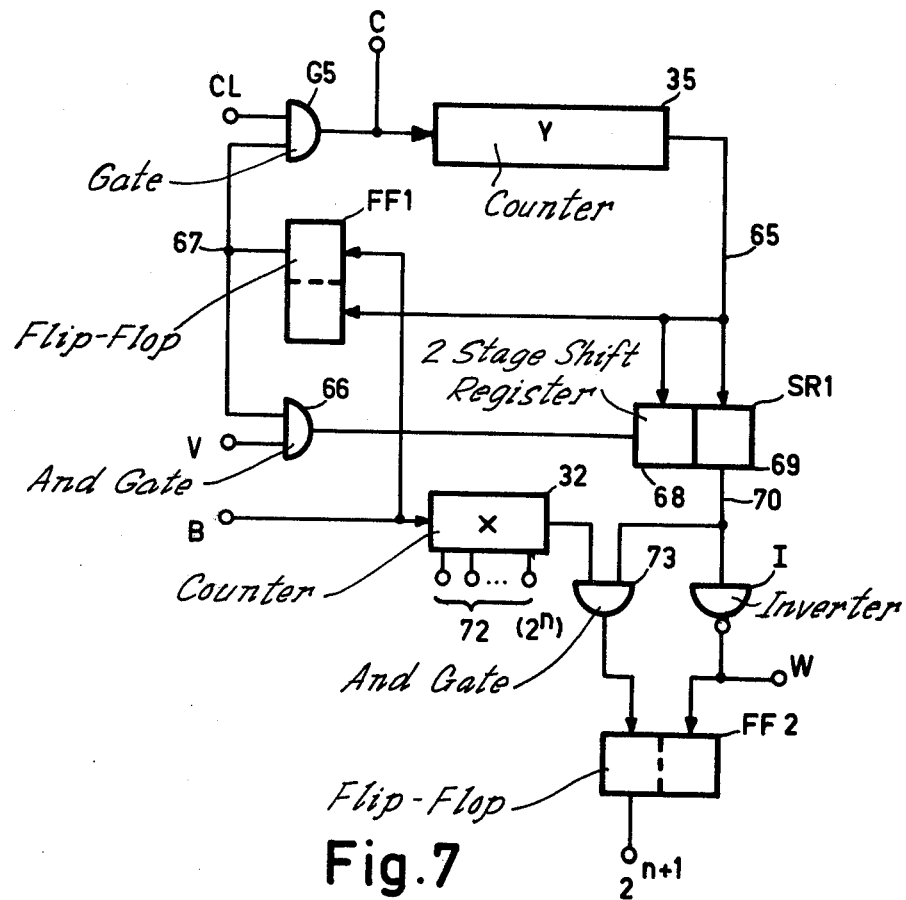
FIG. 7 is a black diagram of control circuits for the operation of the circuits of FIG. 8.

Referring to FIG. 7, control circuits are shown which are used to control the more detailed apparatus to be described with reference to FIG. 8. Clock pulses CL from a source not shown are applied continuously to gate G5. Initially at the start of a Y scan the Flip-Flop FF1 is in that state to apply a '1' signal along line 67 to gate G5 to hold it open. The clock pulses pass through the gate G5 and are counted in the Y counter 35, previously shown in FIG. 3. The gated clock pulse train also passes out via terminal C to the line array camera to clock the photodiode sampling circuit previously mentioned with reference to FIGS. 1 and 2 and also to the circuit described with reference to FIG. 6. The Y counter is initially empty and has a counting capacity equal to the number of photodiodes in the camera. Thus when all the camera photodiodes have been sampled, the Y counter 35 returns to zero count and emits a single pulse along line 65. This pulse is fed to flip flop FF1 to reset it, thus closing gate G5, terminating the clock pulse train at C and leaving the Y counter 35 at zero count ready for the next Y scan. The next Y scan is initiated by a belt pulse B supplied by the incremental encoder 17 of FIG. 1. This pulse B sets FF1 and another train of Y scan clock pulses is transmitted.

During each such Y scan, the thresholded video output V is available at the input of AND gate 66. As previously described, output V consists of a '1' signal for an object picture element present and a '0' signal for a white picture element present. AND gate 66 also receives '1' on its second input if gate G5 is open and thus AND gate 66 output is '1' only during a Y scan and if an object picture element or video '1' is present. Thus AND gate 66 will load a '1' into the first stage 68 of a two-stage shift register SR1 under these conditions. If more than one video '1' signal occurs during a Y scan, stage 68 will remain set at '1'. At the conclusion of the Y scan the pulse on line 65 is applied as a shift pulse to both stages of shift register SR1, moving the '1' into stage 69 where it provides a steady '1' output on line 70 indicating that an object has been encountered. It is presumed herein that unwanted video '1' signals have been removed from the video signal V by the circuit described with reference to FIG. 6. Thus, if an object is encountered several subsequent scans will have at least one video '1' signal and hence stage 69 will continue to supply a '1' output. A '1'output on line 70 can therefore be taken as an 'object present' signal. Inverter 71 produces a '1' output for "object not present", which is required later and in the circuit of FIG. 8.

The belt pulses B are also supplied to the X counter 32 previously shown in FIG. 3. Counter 32 is shown as a binary counter having n stages and hence a counting capacity of $2^n$. Thus the X coordinates can be obtained from the terminals 72. When the counter 32 reaches capacity, it returns to zero at the next belt pulse. Should this occur while an object is being scanned, a further highest order digit '1' should be added to the X address to avoid loss of X datum across the object. Provision is made for this eventuality by arranging and AND gate 73 to receive the counter 32 overflow pulse and the 'object present' signal described above. Thus flip flop FF2 is set to provide a '1' on the terminal marked $2^{n+1}$ if the X counter overflows while an object is present. When the object is no longer present the output of inverter 71 supplies a '1' to reset FF2 to restore the $2^{n+1}$ output to '0', effectively shifting the X datum to zero in preparation for a subsequent object.

Figure 8:
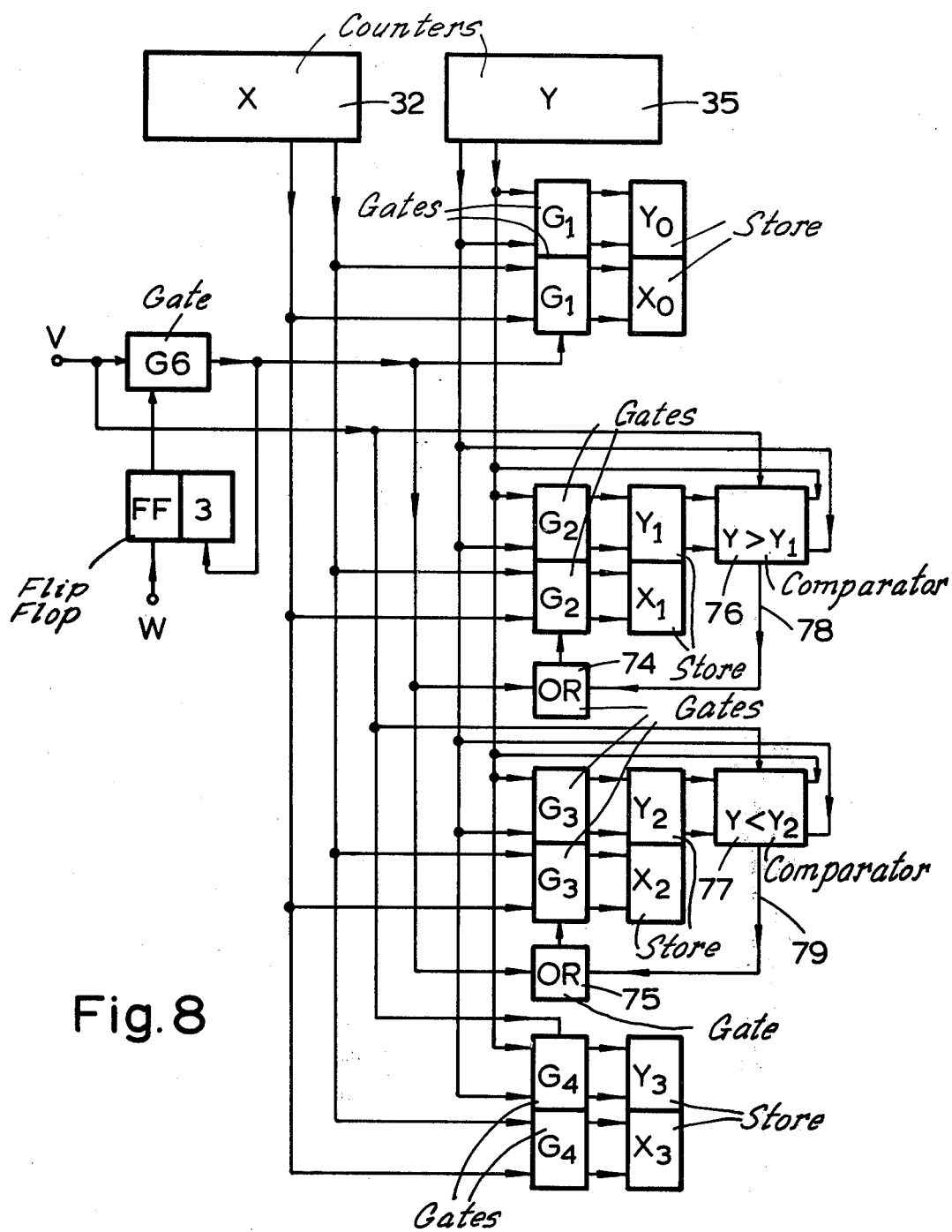
FIG. 8 is a more detailed signal flow diagram of the system of FIG. 3.

FIG. 8 shows the operation of FIG. 3 in more detail. The X counter 32 and the Y counter 35, previously described, are shown without their input and overflow connections for simplicity. Both counters have a number of binary output lines, of which only two are shown in each case also for simplicty. The gates G1, G2, G3 and G4 of FIG. 3 are now shown to be twp-part gates, one part for X, one for Y. Likewise the stores X0, Y0; X1, Y1; X2, Y2 and X3, Y3 are shown as two part stores. The video input V is applied to a gate G6 controlled by a flip flop FF3. The W signal derived in the circuit of FIG. 7 is applied to flip flop FF3 to open gate G6 when the previous object has passed the camera. The first '1' signal to arrive from the next object passes through gate G6 and resets FF3 to close gate G6. The G6 output is a single pulse at the start of an object. This pulse is routed to G1 to sample the contents of the X and Y counters at the instant of arrival of this first video '1' signal. No more gate pulses are applied to G1 for the remainder of the object since the W signal disappears at the end of the first Y scan and is not restored until the object has been completely scanned. FF3 is only set or reset by positive-going edge signals and not by a steady '1' value. As previously described stores X0, Y0 now contain the coordinates of the first point.

The single G6 pulse output is also routed via OR gates 74 and 74 to gates G2 and G3 respectively. Stores X1, Y1 and S2, Y2 are thus set to the X0, Y0 value initially, to cover the events (a) that one or other of the near and distant points may be coincident with the first point and (b) that the store X2, Y2 must start at a value sufficiently high in order that the near point determination can be made correctly as will be described later.

The video signal v is routed to the comparators 76 and 77 and to gate G4 on all scans. The effect is that every video '1' signal acts to initiate a comparison between the stored values in Y1 and Y2 and the instantaneous value of Y occurring at that moment. This in comparator 76 a '1' output on line 78 is obtained if Y is greater than Y1. This output passes via OR gate 74 to open G2 to set both the X1 and Y1 stores to the instantaneous values of X and Y then occurring. The sequence of events with comparator 77 differs only in that the output on line 79 is obtained when Y is less than Y2. Thus at the conclusion of scanning, stores X1, Y1 and X2, Y2 contain the coordinates of the near and distant points respectively since the comparison operations described above are conducted afresh at every video '1' pulse occurring throughout object scanning, previous stored values being overwritten at each comparison if the equation is true.

Finally, the video output is used to open gate G4 at every video '1' signal and store instantaneous values of X and Y then occuring, previous values being overwritten. Thus the last video '1' signal on the last Y scan will leave the coordinates of the last point in the X3, Y3 store.

Figure 9:
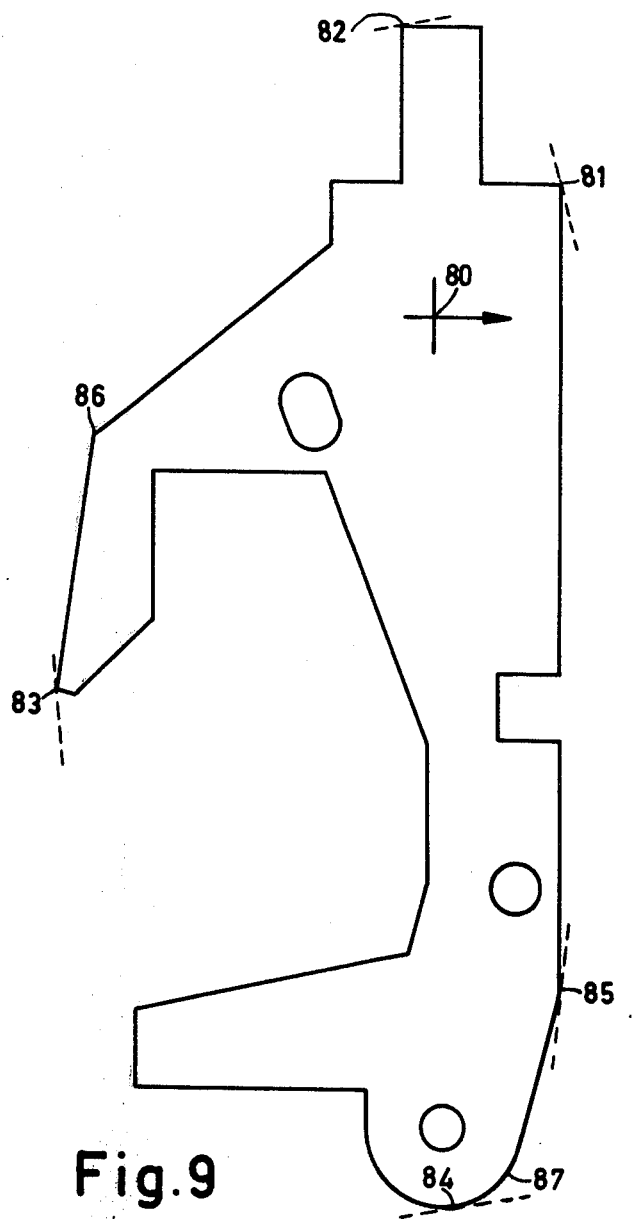
FIG. 9 shows a more complex object with tangents applied.

In this connection FIG. 9 shows a more complex object whose position and orientation are to be determined, and FIG. 10 shows the reference table stored for this purpose. The first column of FIG. 10 gives a sequence number of the orientation. The last column gives this orientation at which a circle of 360° has been divided into 256 equally large units (approximately 1°24'). The machine store stores a series of data for each interval of two angle units, the Figure only showing an extract therefrom. FIG. 9 shows, at "80", a system of coordinates in which the arrow indicates the direction "zero angle units"; this arrow is perpendicular to the right side of the object. In the case of an orientation slightly greater than zero units (0.5) the point X0.Y0) is situated at 81, see the inserted tangent; the point (X1, Y1) is situated at 84, the point (X2, Y2) at 82, and the point (X3, Y3) at 3. For the determination of the position and the orientation of the object, the following steps can be executed by means of a digital computer; however, as will be later explained, the use of a microprocessor of adapted capacity is more economical. After the coordinates of the four tangent points have been determined in accordance with the foregoing by means of the apparatus shown in FIG. 8 (a scan without video signal "1" indicates that the object has been completely scanned), the coordinates are normalised by subtracting those of the point (X0, Y0). The coordinates of the first point will then always be (0, 0) and are not shown in the Figure as such, while the (X, Y) coordinates of the other points are known as relative data: the reference values are given in the second through the seventh column of FIG. 10. The relative values of the X-coordinates are then always greater than or equal to zero, because these points are found simultaneously with or after the first point X0, Y0). In view of the coordinate directions in FIG. 4, the relative values of Y1 are always smaller than or equal to zero, and the relative values of Y2 are always larger than or equal to zero; the relative values of Y3 may be positive as well as negative. If the orientation changes in FIG. 9 from 0.5 to 2.5 angle units, the point (X0, Y0) shifts to the position 85 (see the tangent denoted by a broken line at this position). All relative X-coordinates then hardly change, but the stored Y-coordinates are all increased by about 30 points. Between 6.5 and 8.5 angle units, the point (X3, Y3) shifts to position 86; between 10.5 and 12.5 the point X0, Y0) shifts to the position 87, etc. The linear coordinates can be expressed in and rounded off to millimeters in accordance with FIG. 10, but other units of round-offs can be used equally well. The eighth and the ninth column of FIG. 10 give the coordinates of the reference point, which is the origin of the system of coordinates shown in FIG. 9. The column states the relative X-coordinate with respect to the measured value of the absolute coordinate X0. The column Yr states the relative Y coordinate with respect to the point Y (X1, Y1). This is a better solution because at the area of the point (X0, Y0) the coordinate Y0 along the tangent is determined; in some cases this is done with a comparatively greater inaccuracy. In other cases both coordinates of the first point (X0, Y0) can be used for determining both relative coordinates of the reference point.

In deriving the table of FIG. 10, it is advantageous to apply an adequate amount of data concerning the outline of the object and the position of the reference point to a computer and to program the computer for the calculation of the relative positions of the points (X2, Y2), (X3, Y3) and (Xr, Yr). For the further description of the invention it is assumed that the results of these calculations are continuously available in advance in the form of a table.

The following steps are executed during the determination of the position and the orientation of the object.

All the entries in the table are examined and for each entry each of the six normalised ordinates X1', Y1', X2', Y2', X3' and Y3' recorded in the table is subtracted from the corresponding normalised ordinate obtained by scanning the object. The result of each subtraction is tested for magnitude only and if each such result is less than a predetermined margin for all the six ordinates of that entry then the value of $\theta$ and (Xr, Yr) associated with that entry is noted. If during the examination of the whole table only one entry is found which satisfies the above margin test, then the associated values of $\theta$ and (Xr, Yr) are used to set the pick-up device 4. If no entry satisfies the margin test, the object is rejected. If however, more than one entry satisfies the margin test, these entries only are retested with a smaller margin with the object of eliminating all but one of the entries. If this retest fails to find one surviving entry, a further retest with a yet closer margin may be conducted or the object may be rejected.

A problem which can occur in referring to the table to read off the orientation $\theta$ and the position (Xr, Yr) of the reference centre of the object is that small changes in angle of straight sides nearly parallel to the X or Y axes can produce sudden large changes of values in the coordinates of the principal points. This can be countered by adding to the table all possible sets of coordinate values that could occur in such situations. But there is still the possibility that a set of such values can occur which are close to another set which give a quite different value of $\theta$. That is, large scale ambiguities could occur. This problem is dealt with by the reduced margin test mentioned above.

The tables for many different components can be stored in, say, a magnetic tape cassette and any one table can be transferred to the computer store when the object handling apparatus is set up for the associated component. Thus one handling apparatus can accept a variety of components on a batch basis. It is alos possible to modify the system to derive the principal points from inside edges of the component. Similarly, either more or less than four principal points may be used on inner or outer edges.

Figure 13:
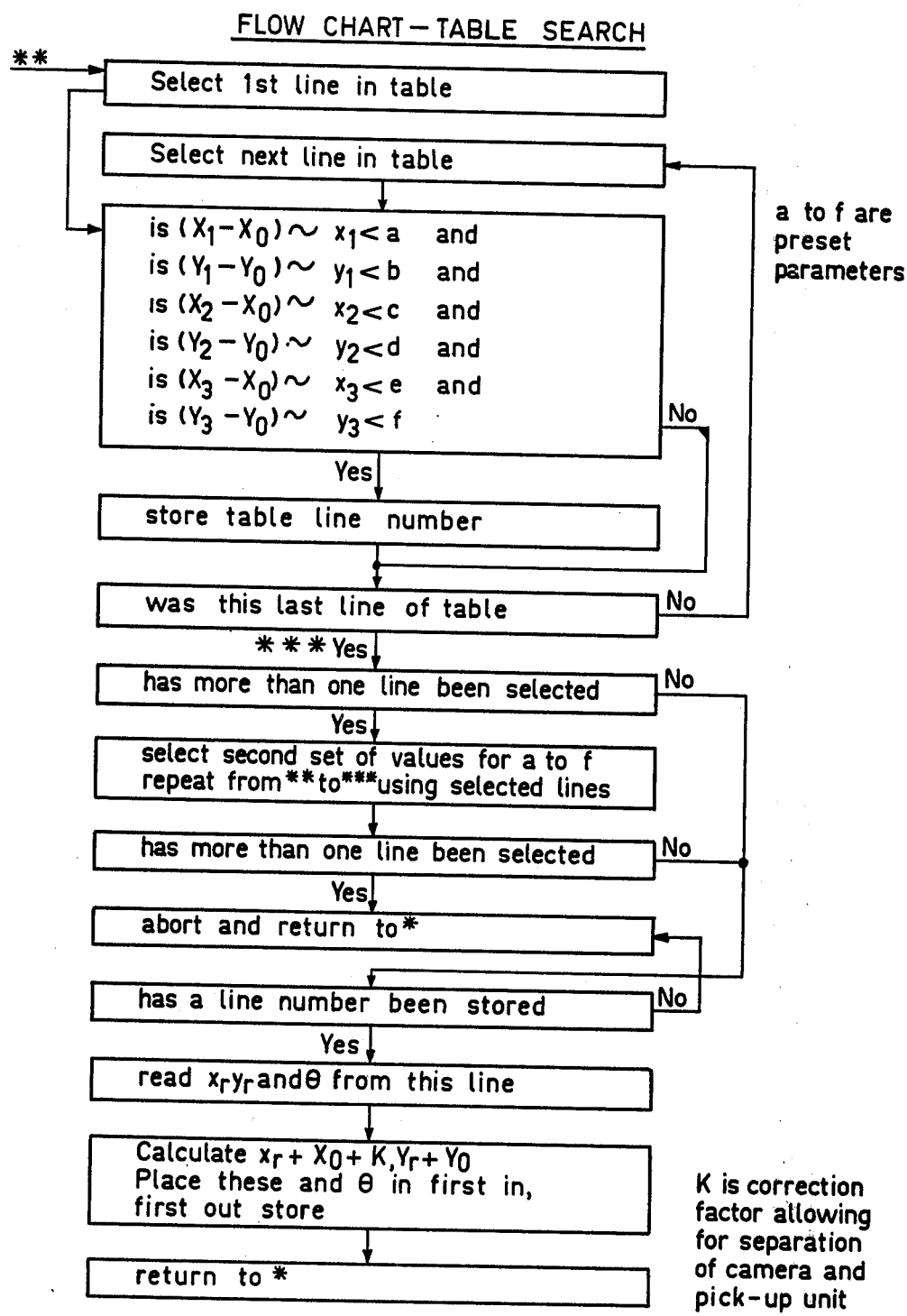
FIG. 13 is a flow chart of the logical process of determining the orientation and position corresponding to a set of tangent points.

FIGS. 12 and 13 are exemplary flowcharts showing the logical process of the location of the four tangent points, and of the search of the table for finding the definitive orientation and relative positions, respectively. In FIG. 12 during the scanning of a field according to successive Y-trajectories at occurrence of an object, first all four tangent point stores are filled and the object present flag bit is set, whereafter three of the tangent point stores may be modified. Finally, the Y-scans are all white again (no object) and further updating is terminated. Next, the operation of FIG. 13 is entered at the double asterisk.

FIG. 13 shows the finding of the orientation and position of the object. The chart has two exists: success, when a single table entry is selected, and failure, where either no orientation has been found or two orientation give equal match quality. The two exits by means of an asterisk lead again to FIG. 12. Note that in this case both X0 and Y0 have been used as reference coordinates.

In practice, reliance would be placed on the detailed choice of the profile of the object to make the determination of orientation less confused. For example, problems arise when two adjacent sides of the object are inclined at the same angle to one another as the line of photodiodes is inclined to the direction of belt motion. Typically this latter angle is a right angle and many component parts may occur in which straight sides at right angles to one another may be found. For example if the first side to be scanned is straight and nearly parallel to the line array, a very small change inn inclination of the side will cause the first point to move from one end of the side to the other. If the bottom side of the object is at right angles to this first side then the same small change in inclination may cause the near point to move from one end of the bottom side to the other. In practice, either of the two first point positions may occur with either of the two near point positions, give four possible combinations of widely differing ordinates corresponding to a very small range of orientations. This situation could be relieved by deliberately avoiding exact right angles in component design or by providing a projection at one end of a side to ensure in the above example that the near point shift occurs at an orientation distinctly separate from that at which the first point shift occurs. In practice a proposed object profile would be tested on a large scale computer, deliberately adding small shifts in inclination of each side separately to determine if such ambiguity problems will arise. When a satisfactory profile had been found the computer will then provide the pre-calculated table required for the object.

Figure 11:
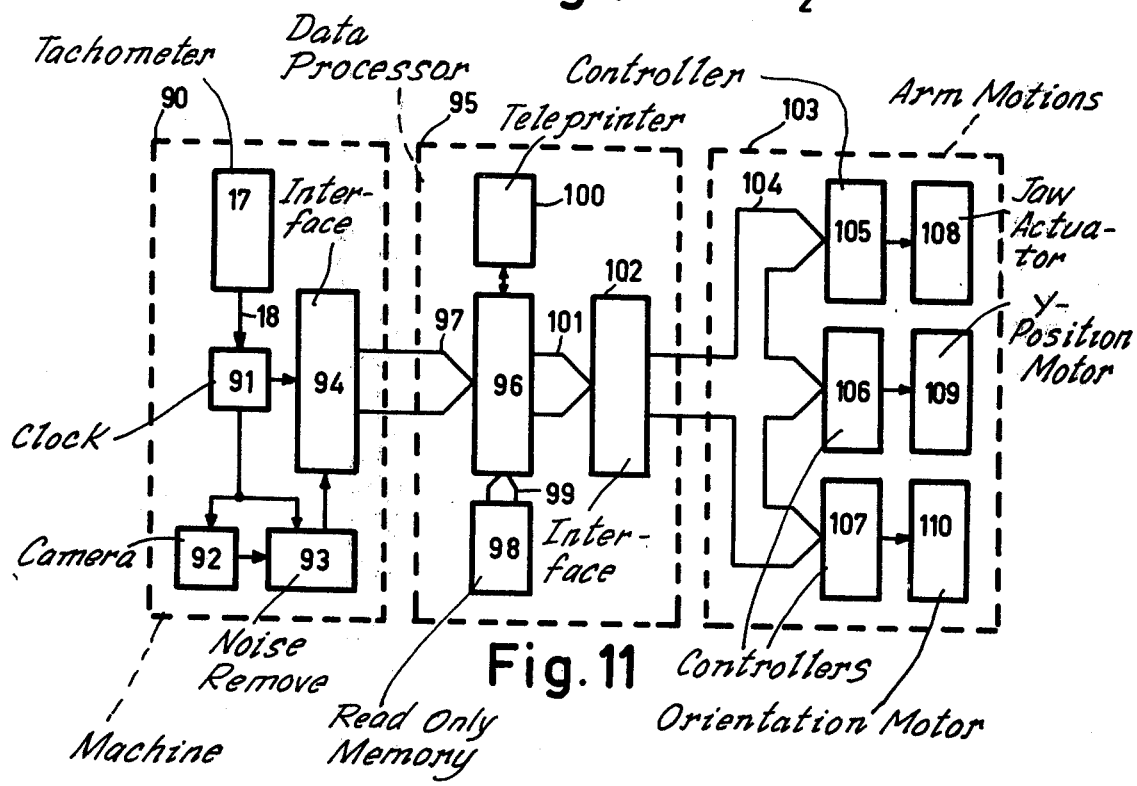
FIG. 11 is a block diagram of the apparatus electrical equipment.

FIG. 11 shows a block diagram of the electrical equipment. The section 90 receives the external information. The section 90 comprises a clock 91 which is controlled via the line 18 by the tachometer 17 which in turn is driven by the belt 2 as described. The clock 91 applies synchronisation signals to the camera 92 which may be, for example, an IPL 7128 Scanning Array. The signals of the camera 92 are applied to the device 93 which serves to remove noise from the video information and which has been described with reference to FIG. 6. Signals from the clock again serve for synchronisation. The restored video signals are applied to the interface 94 which is also controlled by the clock 91 and which serves to prepare the signals for processing by a microprocessor. This preparation concerns logic signal levels, any buffering, imparting the correct format to the signals, etc.; these procedures per se are known for the normal microprocessors. The section 95 comprises the elements for the data processing. The central element is formed by the element 96 which receives the input data from the section 90 via the data path 97. The line 97 transports a number of bit signals in parallel. The element 96 comprises a microprocessor system which is based, for example, on one or more microprocessors of the type INTEL 8080, together with one or more random access stores of the type 91 L02. The section 98 comprises one or more read-only stores of the type INTEL 1702A whose contents can be received by the element 96 via the data path 99. Control lines for this transport have been omitted for the sake of simplicity. The element 100 serves for the input and output of data and may be a peripheral apparatus such as a teleprinter. In the element 96 the described determination of the position and the orientation of the object takes place. Via and data path 101 these data are applied to the interface 102 to enable adaptation to the section 103. The section 103 comprises the elements which enable and control the movement of the arm. The adaptation of the data serves inter alia for the correct selective transport via the data path 104 to the control elements 105, 106, 107. These elements can be controlled by the data concerning the orientation and position in two directions and comprise, for example, a comparison device based on operational amplifiers. The data path information is applied thereto via digital-to -analog converters. The element 107 controls the motor 110 until the orientation of the jaws is correct. For this purpose a known feedback (not shown) may be present in that the motor compriss a position detector. The element 106 controls the motor 109 to make the pick-up jaws assume the correct Y-position, with or without positional feedback. The element 105 controls the instant at which the object is to be picked up by means of the pick-up control 108. Either a predetermined delay is then adjusted (depending on the reference position of the object in the X-direction and the known speed of the conveyor belt) or a feedback is achieved by means of further tachometer pulses.

It may occur that not one orientation is found during the optical scanning. This may be due to damage or, for example, successive objects being situated one on top of the other. In that case no gripping operation is performed. The gripping mechanism will not be elaborated herein, because the technique of gripping is generally known. The invention can be utilized when the motion of the underlying layer is a rotation. The invention can be utilized with incident or reflected light. The invention can be utilized for objects floating on a liquid. Picking up can be effected by magnetic forces instead of mechanical forces. Picking up per se can also be understood to mean such other ways as treating an object as, for example, providing the object with a stamp or label. The invention can thus be utilized in varius manners.

What is claimed is:

1. An apparatus for locating an object having a predetermined projection figure on a projection surface, comprising:

first means for linear scanning in a raster pattern, said first means including means for providing unidirectional non-repetitive longitudinal linear relative motion between the object and a straight line perpendicular to the longitudinal motion, a sequentially scanned linear array of radiation detectors arranged along said straight line, and means for repetitively scanning said linear array, whereby said projection figure has relative motion perpendicular to said array, second means for determining first tangent points of a first pair of tangents parallel to the line scan of said raster upon an initial detection of a projection figure by a line scan during the frame scanning motion, said initial detection being a detection of a farthest extending point of the projection figure in response to said linear scanning; said first tangent points being applied to opposite sides of said projection figure, and being the interception points of the first and last line scans to intercept said figure, third means for determining second tangent points of a second pair of tangents to said projection figure, said second pair of tangents being parallel to the frame scanning motion of said raster and being applied to opposite sides of said projection figure, said second tangent points being the interception points of the line scans which intercept said figure earliest and latest from the start of their scans, and fourth means for determining, on the basis of the relative positions of the four tangent points, first, the orientation of the object with respect to said line and frame scanning motions and, second, the position of a reference point on the object relative to the tangents.

2. An apparatus as claimed in claim 1 wherein said fourth means comprises means for storing a table of sets of values of relative tangent point positions, pre-calculated from the predetermined outline of the projection figure, each such set of values being associated with an orientation angle and the reference point position which occurs with that set of values, and means for selecting an orientation angle and reference point position which is associated with a pre-calculated set of relative tangent point positions most closely approximating the set of relative point positions determined by said second and third means.

3. An apparatus as claimed in claim 1 comprising a support, and a radiation source arranged underneath the support, the support being transparent to radiation emitted by said source, radiation transmitted by the support and not blocked by an object placed on the support being detectable by said first means.

4. An apparatus for treating an object, said apparatus includes an apparatus as claimed in claim 1 for locating the object.

5. An apparatus as claimed in claim 1, wherein said first means includes a single detector array only, said single detector array being a linear array of equally spaced radiation detectors.

* * * * *